Patented Sept. 16, 1924.

1,509,088

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

MAKING BUTTER FROM MILK OIL.

No Drawing. Application filed April 11, 1924. Serial No. 705,931.

*To all whom it may concern:*

Be it known that I, CHARLES E. NORTH, a citizen of the United States, residing at Montclair, in the county of Essex and State of New Jersey, have invented certain new and useful Improvements in Making Butter from Milk Oil, of which the following is a full, clear, and exact description.

In an application filed by me on March 28, 1924, Serial No. 702,569, I have described a process of making butter, without churning, from milk oil. This process involves the mixing of milk oil with such an emulsifying agent as milk or skim milk, natural or artificial, and the emulsification of the oil as a preliminary step.

In this case, as in others, I have always assumed that for proper emulsification the oil and the other ingredients must be raised to and maintained at a temperature above the melting point of the fat in order that the latter shall be in a prefectly fluid state as an oil, and have proposed as the best means for accomplishing complete emulsification and reduction of the fat globules to the proper size, that the warm mixture be passed through a mechanical emulsor which would break up the oil into small globules by its mechanical action in forcing the oil through small orifices or between closely approaching disks under high pressure.

I have discovered, however, that in this case and in general where milk oil is to be emulsified with such agents as are present in milk or skim milk, while the emulsification may be accomplished at such high temperatures and by the use of suitable appliances, neither a temperature above the melting point of the oil nor the use of any form of mechanical emulsor is necessary, but that practically complete emulsification may be secured by simply rubbing or stirring the mixed ingredients provided this be done at a time when the mixture has acquired a certain viscosity.

The discovery of this fact contributes very materially to the ease and facility by which such processes as butter making from milk oil may be carried out, for no mechanical emulsor is required and much time and effort is spared in securing the proper emulsification.

The simple stirring of a mixture of this character while the viscosity of its thickness is very slight has but little influence in securing a complete emulsification, and this is due to the fact that when in such liquid form there is practically no resistance in the mass to the free movement of the paddle or other mixing implement, and hence the friction is insufficient to brake up the oil into fine globules and bring about a complete emulsification, but when by a certain increase in the viscosity this resistance becomes substantial and perceptible, the progressive emulsification of the fat occurs.

The present invention depends upon the fact that when a heated mixture of milk fat and milk fluid is cooled the fat loses its fluid condition and the viscosity of the mass is increased. It is recognized that a temperature of 96° F. is the melting point of milk fat and that above this temperature the fat takes the form of a fluid oil. It is also recognized that 55° F. is the best temperature for the churning of butter for the reason that at such temperature the milk fat is in a semi-solid or waxy form in which the globules have a tendency to adhere and agglomerate. There is, however, a zone between 96° F. and 55° F. within which milk fat undergoes a change from a completely fluid to a semi-solid form, and within these limits it is obvious that as the milk fat gradually cools it becomes thicker and more viscous even though it may not have become completely transformed to a waxy or semi-solid consistency. This fact I take advantage of in carrying out my process.

If I take a mixture of milk fat and milk fluid in the proportions of 60 parts of fat to 40 parts of milk fluid and heat the same to about 140° F. the mixture at any temperature above 96° F. is in completely fluid form and no amount of mere mixing will cause emulsification to take place. If, however, the temperature is gradually reduced below 96° F. and a gentle mixing of the mass is continued it will be observed that the thickness or viscosity becomes perceptibly greater at temperatures between 80° F. and 70° F. In fact, this increase in viscosity progresses slowly at about 80° F., and then increases rapidly until the temperature reaches 60° F. This increase in viscosity increases very materially the internal friction of the mass as the mixing or stirring is continued, and as a consequence of this, emulsification very rapidly takes place and a pasty mass with small fat particles results from the friction produced. The size of the fat globules may be reduced to any extent by a continuation of the stirring or mixing alone, and the maintenance of the proper temperature for this purpose may be readily preserved in any well known way.

After complete emulsification has in this manner been brought about, the temperature of the mass may be still further reduced below 60° F., when, as pointed out in my application above referred to, a simple squeezing or working of the paste results instantly in the formation of a very perfect butter.

This process has the merit of being far more simple than that which I have heretofore described for making butter from milk oil. It brings within the easy reach of any one having milk oil and milk fluid, either natural or artificial, the possibility of quickly producing the finest grade of butter without the use of any but the most usual and ordinary appliances. The only implements required are a dish or bowl, a container for containing water at the proper temperature in which the bowl may stand during the operation, and a simple device such as a spoon or paddle to stir the ingredients and to apply the requisite pressure to convert the cooled mass into butter.

What I claim is:

1. The method of producing an emulsion of milk oil and milk fluid, natural or artificial, which consists in mixing these ingredients at a temperature above the melting point of the milk oil and cooling and stirring the same until its viscosity is increased to a point where the internal friction results in emulsification.

2. The method of producing an emulsion of milk oil and milk fluid, natural or artificial, which consists in mixing these ingredients at a temperature above the melting point of the milk oil and cooling the same to a temperature below 80° F. and stirring the same at such temperature until complete emulsification results.

3. The method of making butter from milk oil which consists in mixing milk oil and milk fluid in proportions to produce a high fat concentration and at a temperature above the melting point of the milk oil, cooling the mixture to increase its viscosity to a point where the internal friction causes emulsification of the milk oil as a result of stirring and then to a temperature at which it will be converted into butter by the simple application of pressure.

In testimony whereof I hereto affix my signature.

CHARLES E. NORTH.